United States Patent
Hamamoto et al.

(10) Patent No.: US 8,591,046 B2
(45) Date of Patent: Nov. 26, 2013

(54) HARD-COATED ANTIGLARE FILM, POLARIZING PLATE AND IMAGE DISPLAY INCLUDING THE SAME, AND METHOD FOR PRODUCING THE SAME

(75) Inventors: Daisuke Hamamoto, Ibaraki (JP); Naoki Hashimoto, Ibaraki (JP); Hiroki Kuramoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 487 days.

(21) Appl. No.: 12/899,984

(22) Filed: Oct. 7, 2010

(65) Prior Publication Data
US 2011/0080644 A1    Apr. 7, 2011

(30) Foreign Application Priority Data
Oct. 7, 2009    (JP) ................. 2009-233938

(51) Int. Cl.
*G02B 27/00*    (2006.01)

(52) U.S. Cl.
USPC ........................ 359/601; 359/599; 428/323

(58) Field of Classification Search
None
See application file for complete search history.

(56) References Cited

U.S. PATENT DOCUMENTS

| 6,042,928 | A * | 3/2000 | Suzuki et al. | 428/141 |
|---|---|---|---|---|
| 6,639,725 | B2 * | 10/2003 | Masaki et al. | 359/599 |
| 6,913,365 | B2 * | 7/2005 | Masaki et al. | 362/627 |
| 7,661,832 | B2 | 2/2010 | Iwata et al. | |
| 2005/0255291 | A1 | 11/2005 | Iwata et al. | |
| 2007/0195431 | A1 | 8/2007 | Asakura et al. | |
| 2007/0243370 | A1 | 10/2007 | Wakizaka et al. | |
| 2007/0253066 | A1 * | 11/2007 | Takao et al. | 359/601 |
| 2007/0291367 | A1 * | 12/2007 | Hamamoto et al. | 359/601 |
| 2008/0057228 | A1 | 3/2008 | Horie et al. | |
| 2008/0218865 | A1 | 9/2008 | Iwata et al. | |

(Continued)

FOREIGN PATENT DOCUMENTS

| JP | 2005-316413 A | 11/2005 |
|---|---|---|
| JP | 2007-249191 A | 9/2007 |
| JP | 2007-264113 A | 10/2007 |
| JP | 2007-298974 A | 11/2007 |
| JP | 2008-058723 A | 3/2008 |

(Continued)

OTHER PUBLICATIONS

Report of Reexamination dated Jul. 18, 2013, issued in corresponding Japanese Patent Application No. 2009-233938, w/English partial translation.

*Primary Examiner* — Arnel C Lavarias
(74) *Attorney, Agent, or Firm* — Westerman, Hattori, Daniels & Adrian, LLP

(57) ABSTRACT

The present invention provides a hard-coated antiglare film that has an extremely low haze value, superior anti-fluorescent lamp glare properties, and anti-face glare properties, and can improve the depth of black in black display by preventing white blur from occurring. The hard-coated antiglare film: including a transparent plastic film substrate; and a hard-coating antiglare layer containing fine particles, and has a total haze value in a range of 0% to 5%. The number $N_{total}$ of convexities and the number $N_{50}$ of convexities satisfy the relationship $0.4 \leq N_{50}/N_{total} \leq 0.8$. And the number of convexities in which line segments of portions of the mean line that cross the convexities each have a length of 50 μm or shorter, among convexities the exceed a second standard line that is parallel with the mean line and is located at a height of 0.2 μm, is 10 or less.

9 Claims, 10 Drawing Sheets

(56) References Cited

U.S. PATENT DOCUMENTS

| | | |
|---|---|---|
| 2009/0021834 A1 | 1/2009 | Iwata et al. |
| 2009/0051277 A1 | 2/2009 | Inoue et al. |
| 2009/0061165 A1 | 3/2009 | Iwata et al. |
| 2009/0080082 A1 | 3/2009 | Matsunaga et al. |
| 2009/0128915 A1* | 5/2009 | Weng et al. .................. 359/601 |
| 2009/0147196 A1 | 6/2009 | Horie et al. |
| 2010/0027126 A1* | 2/2010 | Chen et al. .................. 359/601 |
| 2010/0091374 A1 | 4/2010 | Iwata et al. |

FOREIGN PATENT DOCUMENTS

| | | |
|---|---|---|
| JP | 2009-070815 A | 4/2009 |
| JP | 2009-098657 A | 5/2009 |
| JP | 2009-128488 A | 6/2009 |
| WO | 2006/088202 A1 | 8/2006 |
| WO | 2009/119905 A1 | 10/2009 |

* cited by examiner

HARD-COATED ANTIGLARE FILM, POLARIZING PLATE AND IMAGE DISPLAY INCLUDING THE SAME, AND METHOD FOR PRODUCING THE SAME

CROSS-REFERENCE TO RELATED APPLICATION

This application claims priority from Japanese Patent Application No. 2009-233938 filed on Oct. 7, 2009. The entire subject matter of the Japanese Patent Application is incorporated herein by reference.

BACKGROUND OF THE INVENTION

1. Field of the Invention

The present invention relates to a hard-coated antiglare film, a polarizing plate and an image display including the same, a method for producing the same, and a method for evaluating the same.

2. Description of Related Art

In image displays such as cathode ray tube (CRT) displays, liquid crystal displays (LCDs), plasma display panels (PDPs), and electro luminescence displays (ELDs), hard-coated antiglare films are placed on the surfaces of displays to prevent a decrease in contrast caused by reflections of external light and image. Recently, improvements in image quality and contrast are progressing in LCDs, particularly LCDs used for television sets. One of the causes of decrease in contrast of LCD is a haze value of the hard-coated antiglare film placed on the surface of the display. To further improve the contrast, a hard-coated antiglare film with low haze value is required.

In the conventional hard-coated antiglare film with a relatively high haze value, there is a small difference in degree between fluorescent lamp reflection and face reflection. The fluorescent lamp reflection is a reflection of direct light and is a simple image with a high light quantity, and antiglare properties are judged by observing whether or not a reflected edge of an image is clear with naked eyes. On the other hand, the face reflection is a reflection of indirect light and is a complex image with a low light quantity. In this case, antiglare properties are judged by observing an extent of blur of an entire image with naked eyes. However, in the hard-coated antiglare film whose antiglare properties are suppressed to the fullest extent possible to realize a low haze value, designing to prevent both the two types of reflections typified by the fluorescent lamp reflection and the face reflection has been difficult. Furthermore, in the case where the surface unevenness is increased to improve antiglare properties while maintaining a low haze value, there is a problem in white blur in an oblique direction, that is, white blur is observed due to excessively intensive scattering of reflected light when the panel surface is viewed from the oblique direction. Generally, although an improvement in antiglare properties and an improvement in contrast or white blur are considered to have a contradictory relationship, various proposals have been made to obtain both these properties. For example, aggregates with three-dimensional structures formed of the particles present in an antiglare layer are being studied (for instance, see JP 2005-316413 A, JP 2007-264113 A, and JP 2007-249191 A). Further, an uneven shape on the topmost surface of an antiglare layer designed to prevent reflection and white blur is being studied (for instance, see WO 2006/0088202 A, and JP 2009-98657 A). These are merely studies of fluorescent lamp reflection, and studies to prevent face reflection or both the fluorescent lamp and face reflections have not been carried out.

SUMMARY OF THE INVENTION

The hard-coated antiglare film of the present invention is a hard-coated antiglare film including a transparent plastic film substrate; and a hard-coating antiglare layer containing fine particles, which is on at least one surface of the transparent plastic film substrate, wherein the hard-coated antiglare film has a total haze value in a range of 0% to 5%, the number $N_{total}$ of convexities that exceed a first standard line that is parallel with a roughness mean line of a surface roughness profile and is located at a height of 0.1 μm is at least 15 in a 4-mm long portion at an arbitrary location of the surface of the hard-coating antiglare layer, when the number of convexities in which line segments of portions of the mean line that cross the convexities each have a length of 50 μm or longer is indicated by $N_{50}$, $N_{total}$ and $N_{50}$ satisfy a relationship expressed by the following formula (1), and the number of convexities that cross a second standard line that is parallel with the roughness mean line and is located at a height of 0.2 μm, in which the line segments of portions each have a length of 50 μm or shorter is 10 or less.

$$0.4 \leq N_{50}/N_{total} \leq 0.8 \tag{1}$$

The polarizing plate of the present invention includes a polarizer and the hard-coated antiglare film of the present invention.

The image display of the present invention includes the hard-coated antiglare film of the present invention.

The image display of the present invention includes the polarizing plate of the present invention.

The method for producing a hard-coated antiglare film of the present invention includes: providing fine particles, a material for forming a hard-coating layer, and a material for forming a hard-coating antiglare layer, which contains a solvent; forming a film by applying the material for forming a hard-coating antiglare layer onto one surface of the transparent plastic film substrate; and forming a hard-coating antiglare layer by curing the film. As the solvent, a solvent in which a ratio of alcohol solvent is 50% by weight or more is used.

The hard-coated antiglare film evaluating method of the present invention includes: evaluating visibility of a hard-coated antiglare film using $N_{total}$, $N_{50}$, and $N_{0.2}$, which are defined below, assuming that the hard-coated antiglare film has a total haze value in a range of 0% to 5%.

$N_{total}$: the number of convexities that exceed a first standard line that is parallel with a roughness mean line of a surface roughness profile and is located at a height of 0.1 μm in a 4-mm long portion at an arbitrary location of the surface of the hard-coated antiglare film.

$N_{50}$: the number of convexities that exceed the first standard line, in which line segments of portions of the mean line that cross the convexities each have a length of 50 μm or longer in a 4-mm long portion at an arbitrary location of the surface of the hard-coated antiglare film.

$N_{0.2}$: the number of convexities in which line segments of portions of the mean line that cross the convexities each have a length of 50 μm or shorter among convexities that exceed a second standard line that is parallel with the mean line and is located at a height of 0.2 μm, in a 4-mm long portion at an arbitrary location of the surface of the hard-coated antiglare film.

The hard-coated antiglare film of the present invention has both the anti-fluorescent lamp glare properties and anti-face glare properties by obtaining a specific uneven shape in liquid crystal panels and the like such as television sets and monitors (particularly with the number of pixels of 140 ppi or less) and can prevent white blur from occurring. Further, by reducing haze, the depth of black in black display in an image display under dark room environment can be improved. Accordingly, an image display including a hard-coated antiglare film or a polarizing plate of the present invention has superior display properties.

BRIEF DESCRIPTION OF THE DRAWINGS

In FIGS. 13 and 14, 1 is a transparent plastic film substrate, 2 is a hard-coating antiglare layer containing 3 fine particles, P is a polarizer, 4 is a hard-coated antiglare film and 5 is a polarizing plate.

DETAILED DESCRIPTION OF THE INVENTION

Figure 1A:
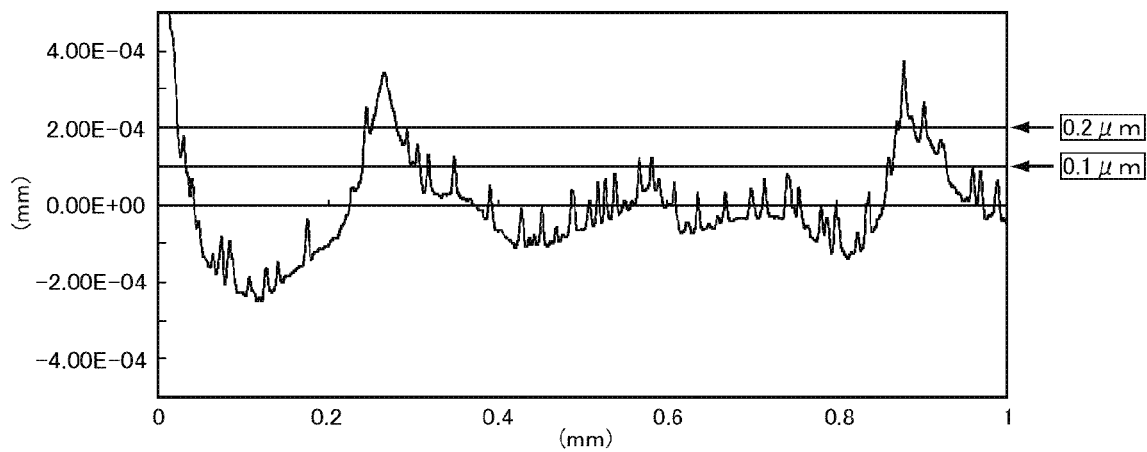
FIG. 1(a) is a diagram showing a profile, which indicates a range of 0 to 1 mm out of a measured length of 4 mm, of a sectional surface shape of a hard-coated antiglare film according to Example 1.

Preferably, in the hard-coated antiglare film of the present invention, in a measured area, 595 μm×452 μm, at an arbitrary location of the surface of the hard-coating antiglare layer, the number $M_{total}$ of convexities that exceed a standard surface that is parallel with a roughness mean surface of a surface roughness profile and is located at a height of 0.5 μm is in a range of 40 to 150, and $M_{total}$ and the number $M_{100}$ of convexities with a cross-sectional area at the standard surface of 100 μm² or more, among the convexities, satisfy a relationship expressed by the following formula (2).

$$0.15 \leq M_{100}/M_{total} \leq 0.5 \quad (2)$$

Preferably, in the hard-coated antiglare film of the present invention, the hard-coating antiglare layer is formed using the fine particles and a material for forming a hard-coating layer, a difference in refractive index between the material for forming a hard-coating layer and the fine particles is in the range of 0.001 to 0.02, and the hard-coating antiglare layer includes at least one type of spherical and amorphous fine particles, each of which have a weight average particle size in the range of 0.5 to 8 μm as the fine particles and the fine particles in the range of 2 to 15 parts by weight per 100 parts by weight of the material for forming the hard-coating layer.

Preferably, the hard-coating antiglare layer has a thickness in the range that is 1.6 to 3 times the weight-average particle size of the fine particles.

Preferably, the hard-coating antiglare layer has a thickness in the range of 3 μm or more and less than 7.5 μm.

Preferably, in the hard-coated antiglare film evaluating method of the present invention, a hard-coated antiglare film is evaluated as acceptable when $N_{total}$ is at least 15, $N_{total}$ and $N_{50}$ satisfy a relationship expressed by the following formula (1), and $N_{0.2}$ is 10 or less.

$$0.4 \leq N_{50}/N_{total} \leq 0.8 \quad (1)$$

Preferably, the hard-coated antiglare film evaluating method of the present invention further includes evaluating visibility of the hard-coated antiglare film using $M_{total}$ and $M_{100}$ which are defined below.

$M_{total}$: the number of convexities that exceed a standard surface of a surface roughness profile that is parallel with a roughness mean surface and is located at a height of 0.5 μm in a measured area, 595 μm×452 μm, at an arbitrary location of the surface of the hard-coated antiglare film.

$M_{100}$: the number of convexities with a cross-sectional area at the standard surface of 100 μm² or more among the convexities.

Preferably, in the hard-coated antiglare film evaluating method of the present invention, a hard-coated antiglare film is evaluated as acceptable when $M_{total}$ is in a range of 40 to 150, and $M_{total}$ and $M_{100}$ satisfy a relationship expressed by the following formula (2).

$$0.15 \leq M_{100}/M_{total} \leq 0.5 \quad (2)$$

Next, the present invention is described in detail. The present invention, however, is not limited by the following description.

The hard-coated antiglare film of the present invention includes a transparent plastic film substrate and a hard-coating antiglare layer that is on at least one surface of the transparent plastic film substrate.

The transparent plastic film substrate is not particularly limited. Preferably, the transparent plastic film substrate has a high visible light transmittance (preferably a light transmittance of at least 90%) and superior transparency (preferably a haze value of 1% or lower). Examples of the transparent plastic film substrate include those described in JP 2008-90263 A. As the transparent plastic film substrate, those having small optical birefringence are used suitably. The hard-coated antiglare film of the present invention can be used, for example, as a protective film for a polarizing plate. In this case, the transparent plastic film substrate preferably is a film formed of triacetylcellulose (TAC), polycarbonate, an acrylic polymer, or a polyolefin having a cyclic or norbornene structure. In the present invention, as described below, the transparent plastic film substrate may be a polarizer itself. Such a structure does not need a protective layer formed of, for example, TAC and simplifies the structure of the polarizing plate. Accordingly, such a structure makes it possible to reduce the number of steps of producing polarizing plates or image displays and to increase production efficiency. In addition, such a structure allows polarizing plates to be formed of thinner layers. When the transparent plastic film substrate is a polarizer, the hard-coating antiglare layer serves as a conventional protective layer. In such a structure, the hard-coated antiglare film also functions as a cover plate in the case where it is attached to the surface of a liquid crystal cell, for example.

In the present invention, the thickness of the transparent plastic film substrate is not particularly limited. For example, the thickness is preferably in the range of 10 to 500 μm, more preferably in the range of 20 to 300 μm, and most suitably in the range of 30 to 200 μm, with consideration given to strength, workability such as handling properties, and thin layer properties. The refractive index of the transparent plastic film substrate is not particularly limited. The refractive index is, for example, in the range of 1.30 to 1.80 and preferably, in the range of 1.40 to 1.70.

The hard-coating antiglare layer is formed using the fine particles and the material for forming a hard-coating layer. Examples of the material for forming a hard-coating layer include thermosetting resins and ionizing radiation curable resins that are cured with ultraviolet rays or light. It also is possible to use, for example, a commercially available thermosetting resin or ultraviolet curable resin as the material for forming a hard-coating layer.

A curable compound having at least one of an acrylate group and a methacrylate group that is cured by, for example, heat, light (for instance, ultraviolet light), or an electron beam can be used as the thermosetting resin or ultraviolet curable resin. Examples of the thermosetting resin or ultraviolet curable resin include silicone resins, polyester resins, polyether resins, epoxy resins, urethane resins, alkyd resins, spiroacetal resins, polybutadiene resins, polythiolpolyene resins, and oligomer or prepolymer of, for example, acrylate or methacrylate of a polyfunctional compound such as polyhydric alcohol. These may be used alone or in a combination of two or more of them.

For example, a reactive diluent having at least one of an acrylate group and a methacrylate group also can be used as the material for forming a hard-coating layer. Examples of the reactive diluent include those described in JP 2008-88309 A, and include monofunctional acrylate, monofunctional methacrylate, polyfunctional acrylate, and polyfunctional methacrylate. The reactive diluent is preferably trifunctional or higher-functional acrylate, or trifunctional or higher-functional methacrylate. This is because it allows the hard-coating antiglare layer to have higher hardness. Examples of the reactive diluent include butanediol glycerol ether diacrylate, isocyanurate acrylate, and isocyanurate methacrylate. These may be used alone or in a combination of two or more of them.

The fine particles for forming the hard-coating antiglare layer have main functions of providing it with antiglare properties by forming the surface of the hard-coating antiglare layer to be formed into an uneven shape and controlling the haze value of the hard-coating antiglare layer. Controlling the difference in refractive index between the fine particles and the material for forming a hard-coating layer allows the haze value of the hard-coating antiglare layer to be designed. Examples of the fine particles include inorganic fine particles and organic fine particles. The inorganic fine particles are not particularly limited. Examples thereof include silicon oxide fine particles, titanium oxide fine particles, aluminum oxide fine particles, zinc oxide fine particles, tin oxide fine particles, calcium carbonate fine particles, barium sulfate fine particles, talc fine particles, kaolin fine particles, and calcium sulfate fine particles. The organic fine particles are not particularly limited. Examples thereof include polymethyl methacrylate resin powder (PMMA fine particles), silicone resin powder, polystyrene resin powder, polycarbonate resin powder, acrylic-styrene resin powder, benzoguanamine resin powder, melamine resin powder, polyolefin resin powder, polyester resin powder, polyamide resin powder, polyimide resin powder, and polyethylene fluoride resin powder. With respect to these inorganic fine particles and organic fine particles, one of them may be used independently or two or more of them may be used in combination.

The weight average particle size of the fine particles is preferably in the range of 0.5 to 8 μm. When the weight average particle size of the fine particles exceeds the aforementioned range, the image sharpness is reduced. On the other hand, when it is smaller than the aforementioned range, sufficiently high antiglare properties cannot be obtained and thereby a problem of increased glare tends to arise. The weight average particle size of the fine particles is more preferably in the range of 2 to 6 μm and yet more preferably in the range of 2 to 5 μm. Furthermore, it also is preferable that the weight average particle size of the fine particles be in the range of 33% to 62.5% of the thickness of the hard-coating antiglare layer. The weight average particle size of the fine particles can be measured by the Coulter counting method. For instance, a particle size distribution measurement apparatus (COULTER MULTISIZER (product name), manufactured by Beckman Coulter, Inc.) using a pore electrical resistance method is used to measure electrical resistance of an electrolyte corresponding to the volume of the fine particles when the fine particles pass through the pores. Thus, the number and volume of the fine particles are measured and then the weight average particle size is calculated.

The shape of the fine particles is not particularly limited. For example, they can have a bead-like, substantially spherical shape or can have an indeterminate shape like powder. However, the fine particles preferably have a substantially spherical shape, more preferably a substantially spherical shape with an aspect ratio of 1.5 or lower, and most preferably a spherical shape.

The ratio of the fine particles to be added is preferably in the range of 2 to 15 parts by weight and more preferably in the range of 4 to 10 parts by weight, per 100 parts by weight of the material for forming a hard-coating layer.

The thickness of the hard-coating antiglare layer is preferably in the range that is 1.6 to 3 times and more preferably 1.7 to 2.5 times the weight average particle size of the fine particles. Furthermore, from the viewpoints of applying properties and pencil hardness, the thickness of the hard-coating antiglare layer is preferably in the range of 3 µm or more to less than 7.5 µm, and it is preferable that the weight average particle size of the fine particles be adjusted so that the thickness is in this thickness range. When the thickness is in the predetermined range, a surface shape of the hard-coated antiglare film of the present invention including large concavities and convexities and small concavities and convexities in balance is easily obtained to have both the anti-fluorescent lamp reflection properties and anti-face reflection properties.

The hard-coated antiglare film of the present invention has a total haze value in the range of 0% to 5%. The aforementioned total haze value is a haze value (cloudiness) according to JIS K 7136 (2000 version), of the entire hard-coated antiglare film. The total haze value is more preferably in the range of 0.5% to 4% and yet more preferably in the range of 1% to 3%. In order to obtain a total haze value in the aforementioned range, it is preferable that the fine particles and the material for forming a hard-coating layer be selected so that the difference in refractive index between the fine particles and the material for forming a hard-coating layer is in the range of 0.001 to 0.02. A total haze value in the aforementioned range allows a clear image to be obtained and can improve the contrast in a dark place. When the haze value is excessively low, a reflection tends to occur.

In the hard-coated antiglare film of the present invention, the surface of the hard-coating antiglare layer has an uneven shape, the number $N_{total}$ of convexities that exceed a first standard line that is parallel with a roughness mean line of a surface roughness profile and is located at a height of 0.1 µm is at least 15 in a 4-mm long portion at an arbitrary location of the surface of the hard-coating antiglare layer, when the number of convexities that exceed the first standard line, in which line segments of portions of the mean line that cross the convexities each have a length of 50 µm or longer is indicated by $N_{50}$, $N_{total}$ and $N_{50}$ satisfy a relationship expressed by $0.4 \leq N_{50}/N_{total} \leq 0.8$, and the number of convexities in which line segments of portions of the mean line that cross the convexities each have a length of 50 µm or shorter, among convexities that exceed a second standard line that is parallel with the mean line and is located at a height of 0.2 µm, is 10 or less.

$N_{total}$ of less than 15 is not preferable because it becomes difficult to obtain anti-fluorescent lamp glare properties and anti-face glare properties. $N_{total}$ is preferably in the range of 15 to 40, more preferably in the range of 17 to 25. When the ratio ($N_{50}/N_{total}$) of $N_{50}$ that indicates the number of relatively large convexities to $N_{total}$ is less than 0.4, it becomes difficult to obtain anti-fluorescent lamp glare properties. When it exceeds 0.8, it becomes difficult to obtain anti-face glare properties. $N_{50}/N_{total}$ is preferably in the range of 0.42 to 0.75, more preferably in the range of 0.45 to 0.7. When the number of convexities in which line segments of portions of the mean line that across the convexities each have a length of 50 µm or shorter among convexities that exceed a second standard line that is parallel with the mean line and is located at a height of 0.2 µm exceeds 10, the number of fine concavities and convexities which have high length are increased and thereby causing white blur to occur. When $N_{total}$, $N_{50}/N_{total}$, and the number of convexities that exceed the second standard line, in which line segments of portions of the mean line that cross the convexities each have a length of 50 µm or shorter are in predetermined ranges in the hard-coated antiglare film, the hard-coated antiglare film includes large concavities and convexities and small concavities and convexities in balance. Thus, it becomes possible to obtain both the anti-fluorescent lamp glare properties and anti-face glare properties, and to prevent white blur from occurring.

The hard-coated antiglare film of the present invention is defined by the size, the number, and the ratio of the convexities, has inner scatter defined by the haze value in the aforementioned range, which allows both the improvements in anti-fluorescent lamp glare properties and anti-face glare properties, and the prevention in white blur and the improvement in contrast under a dark-room environment.

Preferably, in the hard-coated antiglare film of the present invention, in a measured area, 595 µm×452 µm, at an arbitrary location of the surface of the hard-coating antiglare layer, the number $M_{total}$ of convexities that exceed a standard surface that is parallel with a roughness mean surface of a surface roughness profile and is located at a height of 0.5 µm is in a range of 40 to 150, and $M_{total}$ and the number $M_{100}$ of convexities with a cross-sectional area at the standard surface of 100 µm² or more, among the convexities satisfy a relationship expressed by $0.15 \leq M_{100}/M_{total} \leq 0.5$. When $M_{total}$ is 40 or more, it becomes easy to obtain both the anti-fluorescent lamp glare properties and anti-face glare properties. When it is 150 or less, white blur can be prevented from occurring. The $M_{total}$ is preferably in the range of 40 to 120, more preferably in the range of 45 to 100. The $M_{100}/M_{total}$ in the above-described range is preferable in terms of anti-fluorescent lamp glare properties. The $M_{100}/M_{total}$ is preferably in the range of 0.17 to 0.45, more preferably in the range of 0.2 to 0.4.

The hard-coated antiglare film of the present invention can be produced as follows. That is, for example, a material for forming a hard-coating antiglare layer is prepared from the fine particles, the material for forming a hard-coating layer, and a solvent, the material for forming a hard-coating antiglare layer is applied onto at least one surface of the transparent plastic film substrate to form a film (hereinafter referred to as an "applied film"), and the applied film is then cured to form the hard-coating antiglare layer. In the production of the hard-coated antiglare film according to the present invention, it also is possible to use, for example, a transfer method using a mold and a method for providing an uneven shape by a suitable method such as sandblast or embossing roll, in combination.

The solvent is not particularly limited, various solvents can be used, and the solvents may be used alone or in a combination of two or more of them. There are the type of the solvent and the solvent ratio that are optimal to obtain the hard-coated antiglare film of the present invention depending on the composition of a material for forming a hard-coating layer and the type of fine particles.

For example, when a hard-coating antiglare layer is formed by curing an applied film, a hard-coated antiglare film having properties of the present invention can be obtained by using, as the solvent, a solvent in which the ratio of an alcohol solvent is 50% by weight or more, which is used in each of the examples described below. The ratio of the alcohol solvent is preferably in the range of 53% to 90% by weight. Although a haze value, a surface shape, and the like vary depending on the type and the ratio of the solvent, the use of the alcohol solvent at the above-described ratio is preferable because suitable hard-coating antiglare layer can be obtained.

Various types of leveling agents can be added to the material for forming a hard-coating antiglare layer. The leveling agent may be, for example, a fluorine or silicone leveling agent, preferably a silicone leveling agent. As the silicone leveling agent, the reactive silicone is particularly preferred. Addition of the reactive silicone can impart lubricity to the surface and maintain scratch resistance over a long period of time. In the case of using a reactive silicone containing a hydroxyl group, as described below, when an antireflection layer (a low refractive index layer) containing a siloxane component is formed on the hard-coating antiglare layer, the adhesion between the antireflection layer and the hard-coating antiglare layer is improved.

The amount of the leveling agent to be added can be, for example, 5 parts by weight or less, preferably in the range of 0.01 to 5 parts by weight, per 100 parts by weight of entire resin components.

The material for forming a hard-coating antiglare layer may contain, for example, a pigment, a filler, a dispersing agent, a plasticizer, an ultraviolet absorbing agent, a surfactant, an antifoulant, an antioxidant, or a thixotropy-imparting agent, as long as the performance is not impaired, if necessary. These additives may be used alone or in a combination of two or more of them.

Known photopolymerization initiators, for example, those described in JP 2008-88309 A, can be used with the material for forming a hard-coating antiglare layer.

Examples of the method for applying the material for forming a hard-coating antiglare layer onto the transparent plastic film substrate include applying methods such as fountain coating, die coating, spin coating, spray coating, gravure coating, roll coating, and bar coating.

The material for forming a hard-coating antiglare layer is applied to form an applied film on the transparent plastic film substrate and then the applied film is cured. Preferably, the applied film is dried before being cured. The drying can be carried out by, for example, allowing it to stand, air drying by blowing air, drying by heating, or a combination thereof.

The method for curing the applied film formed of the material for forming a hard-coating antiglare layer is not particularly limited but is preferably ultraviolet curing. The amount of irradiation with the energy radiation source is preferably 50 to 500 $mJ/cm^2$ in terms of accumulative exposure at an ultraviolet wavelength of 365 nm. When the amount of irradiation is at least 50 $mJ/cm^2$, the applied film can be cured more sufficiently and the resultant hard-coating antiglare layer also has a further sufficiently high hardness. When the amount of irradiation is 500 $mJ/cm^2$ or lower, the resultant hard-coating antiglare layer can be prevented from being colored.

As described above, a hard-coated antiglare film of the present invention can be produced by forming the hard-coating antiglare layer on at least one surface of the transparent plastic film substrate. The hard-coated antiglare film of the present invention can be produced by producing methods other than that described above. The hard-coated antiglare film of the present invention can have, for example, a hardness of at least 2H in terms of pencil hardness, although it is affected by the thickness of the layer.

An example of the hard-coated antiglare film of the present invention is one with a hard-coating antiglare layer formed on one surface of a transparent plastic film substrate. The hard-coating antiglare layer contains fine particles and thereby the surface of the hard-coating antiglare layer has an uneven shape. In this example, the hard-coating antiglare layer is formed on one surface of the transparent plastic film substrate, but the present invention is not limited thereto. It may be a hard-coated antiglare film with hard-coating antiglare layers formed on both surfaces of the transparent plastic film substrate. Furthermore, the hard-coating antiglare layer of this example is a monolayer, but the present invention is not limited thereto. The hard-coating antiglare layer may have a multilayer structure in which at least two layers are stacked together.

In the hard-coated antiglare film of the present invention, an antireflection layer (low refractive index layer) may be disposed on the hard-coating antiglare layer. For example, a light reflection at the interface between air and the hard-coating antiglare layer is one of the factors that cause a reduction in visibility of images when an image display is equipped with the hard-coated antiglare film. The antireflection layer reduces the surface reflection. The hard-coating antiglare layers and the antireflection layers may be formed on both surfaces of the transparent plastic film substrate, respectively. Furthermore, the hard-coating antiglare layer and the antireflection layer each may have a multilayer structure in which at least two layers are stacked together.

In the present invention, the antireflection layer is a thin optical film having a strictly controlled thickness and refractive index, or a laminate including at least two layers of the thin optical films that are stacked together. In the antireflection layer, the antireflection function is produced by allowing opposite phases of incident light and reflected light to cancel each other out by using the effect of interference of light. The wavelength range of visible light that allows the antireflection function to be produced is, for example, 380 to 780 nm, and the wavelength range in which the visibility is particularly high is in the range of 450 to 650 nm. Preferably, the antireflection layer is designed to have a minimum reflectance at the center wavelength 550 nm of the range.

When the antireflection layer is designed based on the effect of interference of light, the interference effect can be enhanced by, for example, a method for increasing the difference in refractive index between the antireflection layer and the hard-coating antiglare layer. Generally, in an antireflection multilayer having a structure including two to five thin optical layers (each with strictly controlled thickness and refractive index) that are stacked together, components with different refractive indices from each other are used to form a plurality of layers with a predetermined thickness. Thus, the antireflection layer can be optically designed at a higher degree of freedom, the antireflection effect can be enhanced, and the spectral reflection characteristics also can be made even (flat) in the visible light range. Since each layer of the thin optical film must be precise in thickness, a dry process such as vacuum deposition, sputtering, or CVD is generally used to form each layer.

Further, it is preferable that, in order to prevent adhesion of contaminant and improve properties to easily remove adherent contaminant, a contamination preventive film formed of a silane compound having a fluorine group, an organic compound having the same, or the like is stacked on the antireflection layer.

With respect to the hard-coated antiglare film of the present invention, it is preferable that at least one of the transparent plastic film substrate and the hard-coating antiglare layer be subjected to surface treatment. When the transparent plastic film substrate is subjected to the surface treatment, adhesion thereof to the hard-coating antiglare layer, the polarizer, or the polarizing plate further improves. When the hard-coating antiglare layer is subjected to the surface treatment, adhesion thereof to the antireflection layer, the polarizer, or the polarizing plate further improves.

In a hard-coated antiglare film including the transparent plastic film substrate and the hard-coating antiglare layer, which is on one surface of the transparent plastic film substrate, in order to prevent curling, the other surface may be subjected to solvent treatment. Similarly, in the hard-coated antiglare film including the transparent plastic film substrate and the hard-coating antiglare layer, which is on one surface of the transparent plastic film substrate, in order to prevent curling, a transparent resin layer may be formed on the other surface.

The transparent plastic film substrate side of the hard-coated antiglare film of the present invention is generally bonded to an optical component for use in a LCD with a pressure-sensitive adhesive or an adhesive. Before bonding, the transparent plastic film substrate surface may be subjected to a variety of surface treatment as described above.

The optical component can be, for example, a polarizer or a polarizing plate. Generally, a polarizing plate has a structure including a polarizer and a transparent protective film, which is on one or both surfaces of the polarizer. If the transparent protective films are formed on both surfaces of the polarizer, respectively, the front and rear transparent protective films may be formed of the same material or different materials. Polarizing plates are generally disposed on both sides of a liquid crystal cell. Furthermore, polarizing plates are disposed such that the absorption axes of two polarizing plates are substantially perpendicular to each other.

Next, an optical component including a hard-coated antiglare film of the present invention stacked therein is described using a polarizing plate as an example. The hard-coated antiglare film of the present invention and a polarizer or polarizing plate can be stacked together with an adhesive or a pressure-sensitive adhesive and thereby a polarizing plate having the function according to the present invention can be obtained.

The polarizer is not particularly limited and various types can be used. Examples of the polarizer include: a film that is uniaxially stretched after a hydrophilic polymer film, such as a polyvinyl alcohol type film, a partially formalized polyvinyl alcohol type film, or an ethylene-vinyl acetate copolymer type partially saponified film, is allowed to adsorb dichromatic substances such as iodine or a dichromatic dye; and a polyene type oriented film, such as a dehydrated polyvinyl alcohol film or a dehydrochlorinated polyvinyl chloride film.

Preferably, the transparent protective film formed on one or both surfaces of the polarizer is superior in, for example, transparency, mechanical strength, thermal stability, moisture-blocking properties, and retardation value stability. Examples of the material for forming the transparent protective film include the same materials as those used for the aforementioned transparent plastic film substrate.

Moreover, the polymer films described in JP 2001-343529 A (WO 01/37007) also can be used as the transparent protective film. The polymer film can be produced by extruding the resin composition in the form of a film. The polymer film has a small retardation and a small photoelastic coefficient and thus can eliminate defects such as unevenness due to distortion when it is used for a protective film of, for example, a polarizing plate. The polymer film also has low moisture permeability and thus has high durability against moisture.

From the viewpoints of, for example, polarizing properties and durability, the transparent protective film is preferably a film made of cellulose resin such as triacetyl cellulose or a film made of norbornene resin. Examples of commercially available products of the transparent protective film include FUJITAC (product name) (manufactured by Fujifilm Corporation), ZEONOA (product name) (manufactured by Nippon Zeon Co., Ltd.), and ARTON (product name) (manufactured by JSR Corporation). The thickness of the transparent protective film is not particularly limited. It can be, for example, in the range of 1 to 500 μm from the viewpoints of strength, workability such as handling properties, and thin layer properties.

The structure of a polarizing plate with the hard-coated antiglare film stacked therein is not particularly limited. The polarizing plate may have, for example, a structure in which the transparent protective film, the polarizer, and the transparent protective film are stacked in this order on the hard-coated antiglare film, or a structure in which the polarizer and the transparent protective film are stacked in this order on the hard-coated antiglare film.

The image display of the present invention can have the same configuration as those of conventional image displays except for including a hard-coated antiglare film of the present invention. For example, LCD, can be produced by suitably assembling respective components such as a liquid crystal cell, optical components such as a polarizing plate, and, if necessity, a lighting system (for example, a backlight), and incorporating a driving circuit.

The liquid crystal display of the present invention is used for any suitable applications. Examples of the applications include office equipment such as a PC monitor, a notebook PC, and a copy machine, portable devices such as a mobile phone, a watch, a digital camera, a personal digital assistant (PDA), and a handheld game machine, home electric appliances such as a video camera, a television set, and a microwave oven, vehicle equipment such as a back monitor, a monitor for a car-navigation system, and a car audio device, display equipment such as an information monitor for stores, security equipment such as a surveillance monitor, and nursing and medical equipment such as a monitor for nursing care and a monitor for medical use.

EXAMPLES

Next, the examples of the present invention are described together with the comparative examples. The present invention is not limited by the following examples or comparative examples. Various properties in the examples and comparative examples described below were evaluated or measured by the following methods.

(Total Haze Value)

A haze meter ("HM-150" (product name), manufactured by Murakami Color Research Laboratory) was used to measure a total haze value according to JIS K 7136 (2000 version) (haze (cloudiness)).

(Arithmetic Average Surface Roughness Ra)

A glass sheet (with a thickness of 1.3 mm) manufactured by Matsunami Glass Ind., Ltd. was bonded to the surface of a hard-coated antiglare film on which no hard-coating antiglare layer had been formed, with a pressure-sensitive adhesive. Subsequently, the surface shape of the hard-coating antiglare layer was measured using a high-precision microfigure measuring instrument (SURFCORDER ET4000 (product name), manufactured by Kosaka Laboratory Ltd.) on the condition that a cutoff value is 0.8 mm and the arithmetic average surface roughness Ra was then determined. The high-precision microfigure measuring instrument automatically calculates the arithmetic average surface roughness Ra. The arithmetic average surface roughness Ra is indicated according to JIS B 0601 (1994 version).

(The Number of Convexities that Exceed Standard Line)

In the roughness profile (the F profile) obtained through the measurement of the surface shape, the line that was parallel with the roughness mean line of the profile and was located at a height of 0.1 μm was taken as a first standard line, and a line that was parallel with the roughness mean line of the profile and was located at a height of 0.2 μm was taken as a second standard line. On a 4-mm straight line in an arbitrary measurement location, the measured number of convexities that exceed the first standard line was indicated by $N_{total}$, and the number of convexities in which line segments of portions of the mean line that cross the convexities each have a length of 50 μm or longer, among the convexities that exceed the first standard line, was indicated by $N_{50}$. Further, the number of convexities in which line segments of portions of the roughness mean line that cross the convexities each have a length of 50 μm or shorter, among convexities that exceed the second standard line, was measured as a measured value. The number of convexities to be measured was not the number of peaks but the number of portions that cross the standard line.

(The Number and Area of Convexities that Exceed Standard Surface)

A glass plate (with a thickness of 1.3 mm) manufactured by Matsunami Glass Ind., Ltd. was bonded to a surface of a hard-coated antiglare film on which no hard-coating antiglare layer had been formed, with a pressure-sensitive adhesive, and a surface shape of the hard-coating antiglare layer is measured using a non-contact three-dimensional surface shape meter (WYKO (product name), manufactured by Veeco Instruments Inc.) with an objective lens having 10× magnification in a measured area, 595 μm×452 μm. A minimum value of a Z axis was set to 400 nm, and a maximum value of the same was set to 500 nm, a measured data was displayed in grayscale. By carrying out this treatment, only convexities that exceed the maximum value of Z axis of 500 nm can be white display. This image was saved as JPEG, and the saved image was opened with image analyzing software (AZOKUN (product name), manufactured by Asahi Kasei Engineering Corporation). In analysis command, "particle analysis", in the software, a grayscale value was set to 2 (threshold value of 210, removal of small figures of 5), the numbers $M_{total}$ of the respective convexities which exceeds the maximum value of Z axis of 500 nm and cross-sectional areas of the respective convexities were measured. The number of convexities with a cross-sectional area of 100 μm² or more is indicated by $M_{100}$.

(Evaluation of Anti-face Glare Properties)

(1) A black acrylic plate (with a thickness of 2.0 mm, manufactured by Mitsubishi Rayon Co., Ltd.) was bonded to the surface of a hard-coated antiglare film on which no hard-coating antiglare layer had been formed, with a pressure-sensitive adhesive. Thus, a sample was produced that had a back surface with no reflection.

(2) In an office environment (about 1000 Lx) where displays are used in general, the antiglare properties of the sample produced above were judged visually according to the following criteria:

AA: face reflection was not observed with no effect on visibility,

A: face reflection was observed with no problem in practical use,

B: face reflection was observed and slightly hindered the visual observation, and C: face reflection was clearly observed and significantly hindered the visual observation.

(Evaluation of Anti-fluorescent Lamp Glare Properties)

(1) A black acrylic plate (with a thickness of 2.0 mm, manufactured by Mitsubishi Rayon Co., Ltd.) was bonded to the surface of a hard-coated antiglare film on which no hard-coating antiglare layer had been formed, with a pressure-sensitive adhesive. Thus, a sample was produced that had a back surface with no reflection.

(2) In an office environment (about 1000 Lx) where displays are used in general, the sample produced above was placed directly below a fluorescent lamp, the antiglare properties of the sample produced above were judged visually according to the following criteria:

AA: fluorescent lamp reflection was not observed and had no effect on visibility, A: fluorescent lamp reflection was observed, and an edge line was blurry, B: an edge line of fluorescent lamp was observed, and slightly hindered the visual observation, and C: reflection of edge line of fluorescent lamp was clearly observed, and significantly hindered the visual observation.

(Evaluation of White Blur)

(1) A black acrylic plate (with a thickness of 1.0 mm, manufactured by Nitto Jushi Kogyo Kabushiki Kaisha) was bonded to the surface of a hard-coated antiglare film on which no hard-coating antiglare layer had been formed, with a pressure-sensitive adhesive. Thus, a sample was produced that had a back surface with no reflection.

(2) In an office environment (about 1000 Lx) where displays are used in general, the white blur phenomenon was observed visually by viewing the display from the direction that forms an angle of 60° with the reference)(0° that is the direction perpendicular to the plane of the sample thus produced. Then evaluation was made according to the following criteria:

AA: white blur was hardly observed,

A: white blur was observed but had a small effect on visibility, and

B: strong white blur was observed and deteriorated the visibility considerably.

(Refractive Indices of Transparent Plastic Film Substrate and Hard-coating Layer)

The refractive indices of a transparent plastic film substrate and a hard-coating layer were measured with an Abbe refractometer (DR-M2/1550 (product name)) manufactured by Atago Co., Ltd. by a measuring method specified for the apparatus. The measurement was carried out, with monobromonaphthalene being selected as an intermediate liquid, and with measuring light incident on the measuring planes of the film substrate and the hard-coating layer.

(Refractive Index of Fine Particles)

Fine particles were placed on a slide glass, and a refractive index standard solution was dropped onto the fine particles. Thereafter, a cover glass was placed thereon. Thus, a sample was prepared. The sample was observed with a microscope and thereby the refractive index of the refractive index standard solution that was obtained at the point where the profiles of the fine particles were most difficult to view at the interface with the refractive index standard solution was used as the refractive index of the fine particles.

(Weight-average Particle Size of Fine Particles)

By the Coulter counting method, the weight average particle size of the fine particles was measured. Specifically, a particle size distribution measurement apparatus (COULTER MULTISIZER (product name), manufactured by Beckman Coulter, Inc.) using a pore electrical resistance method was employed to measure electrical resistance of an electrolyte corresponding to the volume of the fine particles when the fine particles passed through the pores. Thus, the number and volume of the fine particles were measured and then the weight average particle size thereof was calculated.

(Thickness of Hard-coating Antiglare Layer)

A thickness gauge of a microgauge type manufactured by Mitutoyo Corporation was used to measure a total thickness of the hard-coated antiglare film. The thickness of the transparent plastic film substrate was subtracted from the total thickness. Thus, the thickness of the hard-coating antiglare layer was calculated.

Example 1

As a material for forming a hard-coating layer, provided was an ultraviolet curable resin ("UNIDIC 17-806" (product name), manufactured by DIC Corporation, solid content 80% by weight, solvent: butyl acetate) composed of isocyanurate triacrylate, pentaerythritol triacrylate, dipentaerythritol hexaacrylate, and isophorone diisocyanate polyurethane. The material for forming a hard-coating layer had a refractive index of 1.53. 5 parts by weight of cross-linked acryl-styrene particles ("TECHPOLYMER XX-133AA" (product name), with a weight average particle size of 3.0 μm and a refractive index of 1.525, manufactured by SEKISUI PLASTICS CO., Ltd.) used as the fine particles, 1.0 parts by weight of leveling agent ("GRANDIC PC-4100" (product name), manufactured by DIC Corporation), and 5 parts by weight of photopolymerization initiator ("IRGACURE 907" (product name), manufactured by Ciba Specialty Chemicals) were mixed per 100 parts by weight of the material for forming a hard-coating layer. This mixture thus obtained was diluted with a mixed solvent of isopropyl alcohol (IPA)/cyclopentanone (CPN) (with a weight ratio of 70/30) so as to have a solid concentration of 35% by weight. Thus, a material for forming a hard-coating antiglare layer was prepared.

A triacetyl cellulose film ("TD80UL" (product name), with a thickness of 80 μm and a refractive index of 1.48, manufactured by Fujifilm Corporation) was provided as a transparent plastic film substrate. The material for forming a hard-coating antiglare layer was applied onto one surface of the transparent plastic film substrate with a comma coater. Thus, an applied film was formed. Subsequently, it was heated at 100° C. for one minute and thus the applied film was dried. Thereafter, it was irradiated with ultraviolet light at an accumulated light intensity of 300 mJ/cm² using a high pressure mercury lamp and thereby the applied film was cured to form a 6.0-μm thick hard-coating antiglare layer. Thus, a hard-coated antiglare film of Example 1 was obtained.

Example 2

A hard-coated antiglare film of Example 2 was obtained by the same method as in Example 1 except that the mixture was diluted with IPA.

Example 3

A hard-coated antiglare film of Example 3 was obtained by the same method as in Example 1 except that the mixture was diluted with IPA, and a 5.0 μm-thick hard-coating antiglare layer was formed.

Example 4

A hard-coated antiglare film of Example 4 was obtained by the same method as in Example 1 except that 10 parts by weight of the fine particles and 0.5 parts by weight of the leveling agent were mixed per 100 parts by weight of resin solid content of the material for forming a hard-coating layer, the mixture was diluted with IPA/toluene mixed solvent (with a weight ratio of 75/25) so as to have a solid concentration of 50% by weight, and a 5.0 μm-thick hard-coating antiglare layer was formed.

Comparative Example 1

A hard-coated antiglare film of Comparative Example 1 was obtained by the same method as in Example 2 except that a 4.5 μm-thick hard-coating antiglare layer was formed.

Comparative Example 2

A hard-coated antiglare film of Comparative Example 2 was obtained by the same method as in Example 2 except that 10 parts by weight of the fine particles is mixed per 100 parts by weight of the material for forming a hard-coating layer, and a 6.4 μm-thick hard-coating antiglare layer was formed.

Comparative Example 3

A hard-coated antiglare film of Comparative Example 3 was obtained by the same method as in Example 1 except that 0.5 parts by weight of the leveling agent was mixed per 100 parts by weight of resin solid content of the material for forming a hard-coating layer, the mixture was diluted with an IPA/CPN mixed solvent (with a weight ratio of 40/60) so as to have a solid concentration of 45% by weight, and a 8.0 μm-thick hard-coating antiglare layer was formed.

Comparative Example 4

A hard-coated antiglare film of Comparative Example 4 was obtained by the same method as in Example 1 except that 0.5 parts by weight of the leveling agent was mixed per 100 parts by weight of resin solid content of the material for forming a hard-coating layer, and the mixture was diluted with CPN so as to have a solid concentration of 50% by weight.

Comparative Example 5

A hard-coated antiglare film of Comparative Example 5 was obtained by the same method as in Example 4 except that a 6.0 μm-thick hard-coating antiglare layer was formed.

Comparative Example 6

A hard-coated antiglare film of Comparative Example 6 was obtained by the same method as in Example 2 except that 12 parts by weight of the fine particles and 0.5 parts by weight of the leveling agent were mixed per 100 parts by weight of resin solid content of the material for forming a hard-coating layer, the mixture was diluted so as to have a solid concentration of 45% by weight, and a 5.5 μm-thick hard-coating antiglare layer was formed.

Comparative Example 7

As the material for forming a hard-coating layer, provided was a material for forming a hard-coating layer ("OPSTAR Z7540" (product name), manufactured by JSR Corporation, solid content: 56% by weight, and solvent: butyl acetate/methyl ethyl ketone (MEK)=76/24 (weight ratio)), containing the component (A): dipentaerythritol and isophorone diisocyanate polyurethane; and the component (B): silica fine particles (with a weight average particle size of 100 nm or shorter) whose surfaces are modified by an organic molecule, which satisfy component (A) in total component (B)=2:3 (weight ratio). The cured film of the material for forming a hard-coating layer had a refractive index of 1.485. 5 parts by weight of cross-linked acryl-styrene particles ("TECHPOLYMER XX80AA" (product name), with a weight-average particle size of 5.5 μm and a refractive index of 1.515, manufacapplied film was dried. Thereafter, it was irradiated with ultraviolet light at an accumulated light intensity of 300 mJ/cm² using a high pressure mercury lamp and thereby the applied film was cured to form a 0.1-μm thick hard-coating antiglare layer. Thus, a hard-coated antiglare film of Comparative Example 8 was obtained.

Figure 1B:
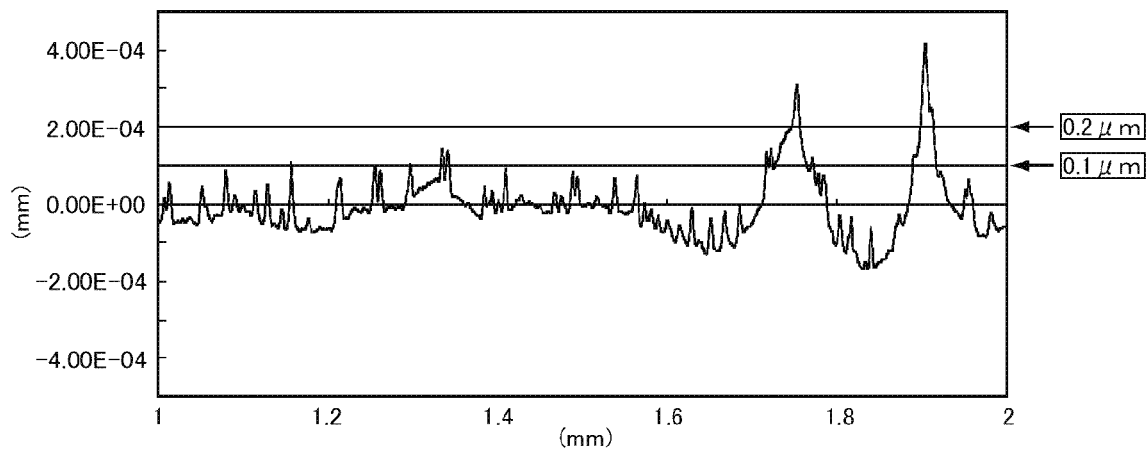
FIG. 1(b) is a diagram showing a profile, which indicates a range of 1 to 2 mm out of a measured length of 4 mm, of the sectional surface shape of the hard-coated antiglare film according to Example 1.
Figure 1C:
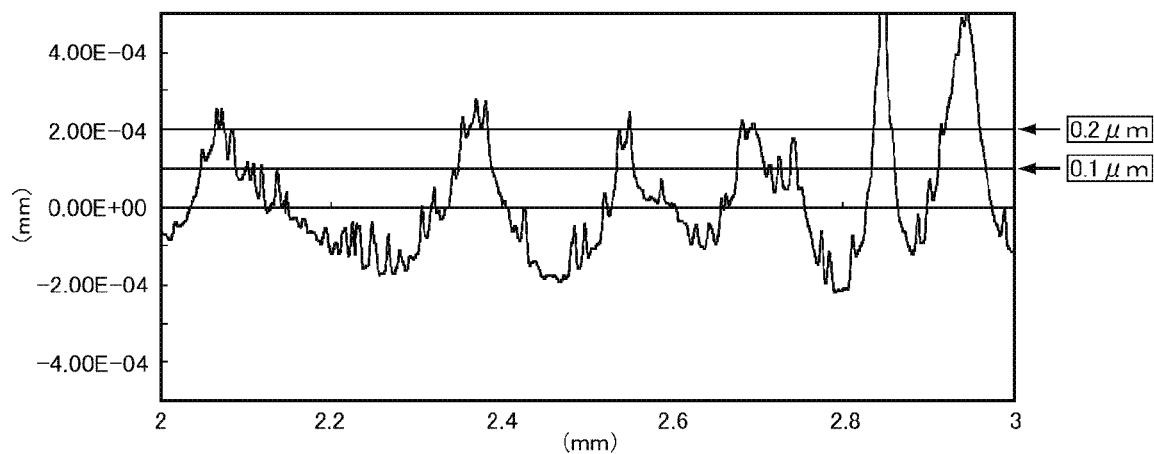
FIG. 1(c) is a diagram showing a profile, which indicates a range of 2 to 3 mm out of a measured length of 4 mm, of the sectional surface shape of the hard-coated antiglare film according to Example 1.
Figure 1D:
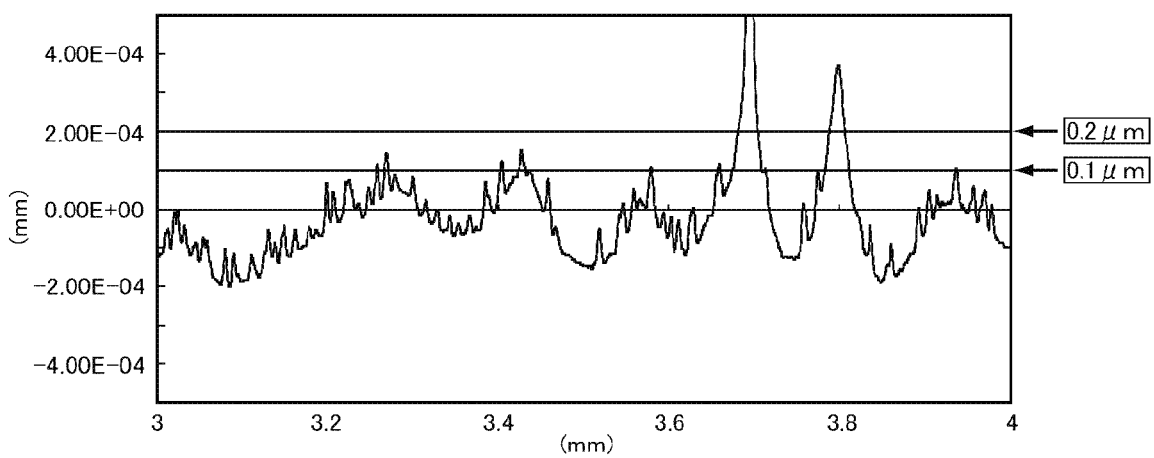
FIG. 1(d) is a diagram showing a profile, which indicates a range of 3 to 4 mm out of a measured length of 4 mm, of the sectional surface shape of the hard-coated antiglare film according to Example 1.
Figure 2:
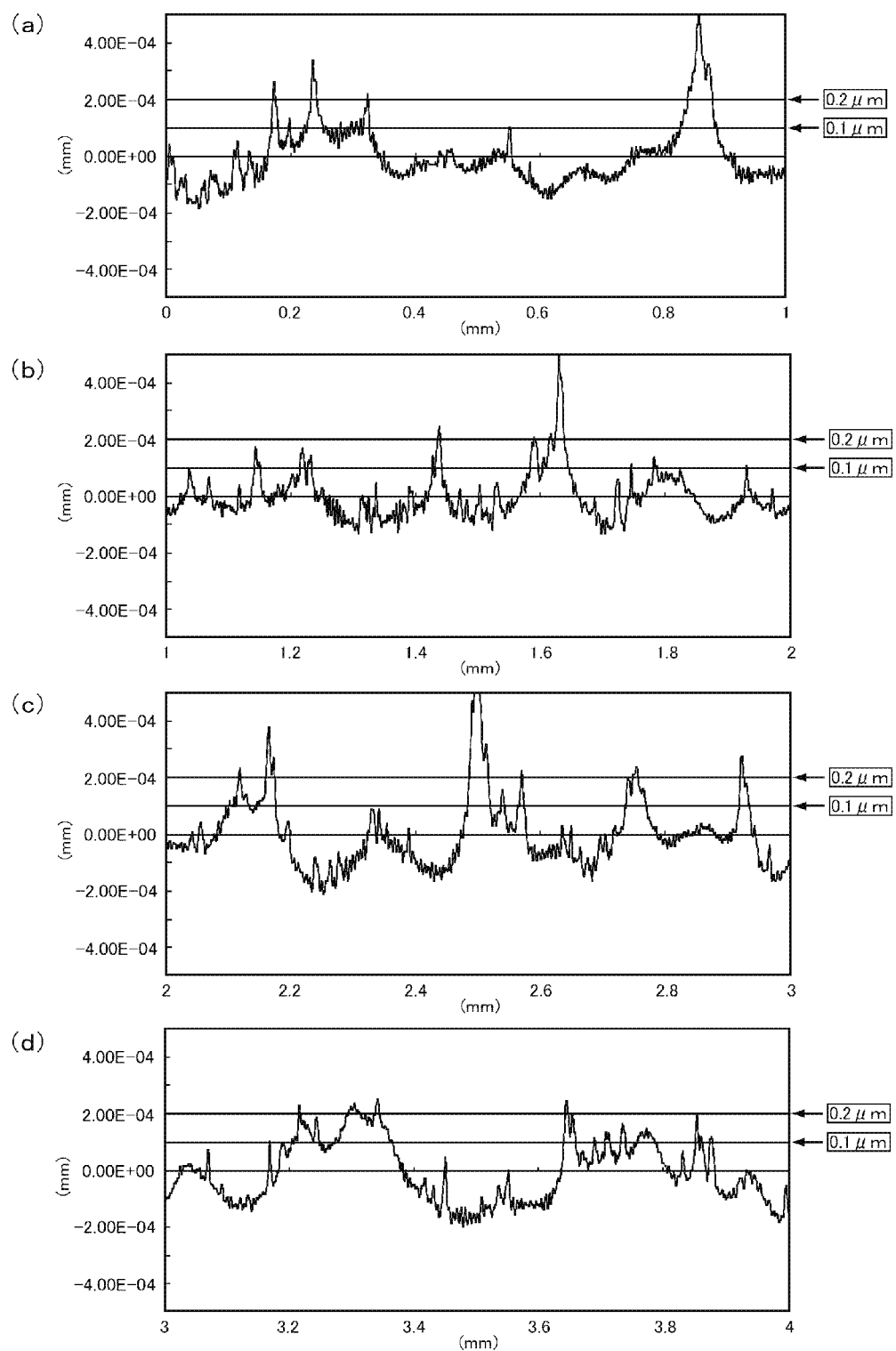
FIGS. 2(a) to (d) are diagrams showing profiles that indicate a measured length of 4 mm of a sectional surface shape of a hard-coated antiglare film according to Example 2; (a) shows a range of 0 to 1 mm, (b) a range of 1 to 2 mm, (c) a range of 2 to 3 mm, and (d) a range of 3 to 4 mm.
Figure 3:
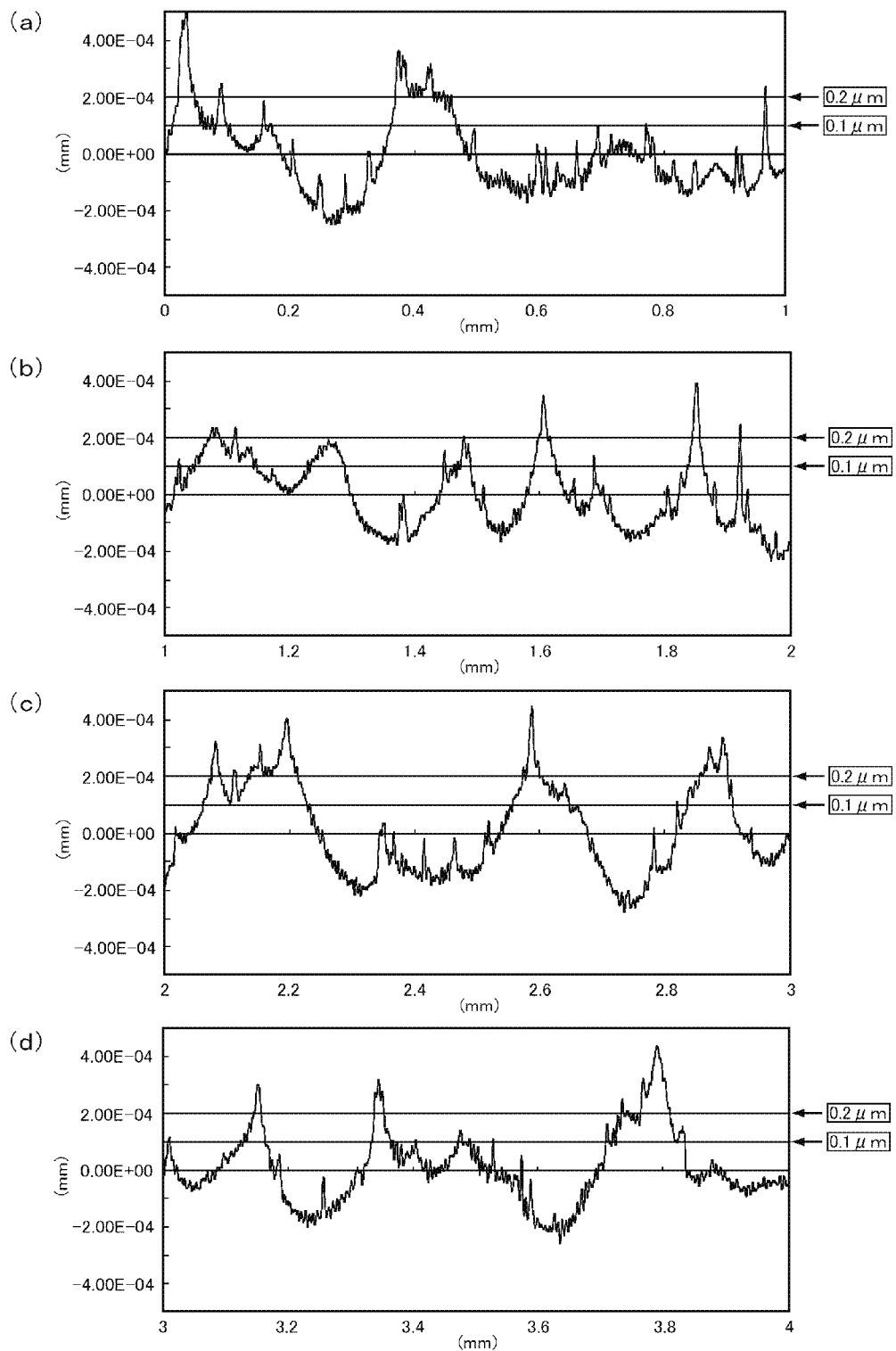
FIGS. 3(a) to (d) are diagrams showing profiles that indicate a measured length of 4 mm of a sectional surface shape of a hard-coated antiglare film according to Example 3; (a) shows a range of 0 to 1 mm, (b) a range of 1 to 2 mm, (c) a range of 2 to 3 mm, and (d) a range of 3 to 4 mm.
Figure 4:
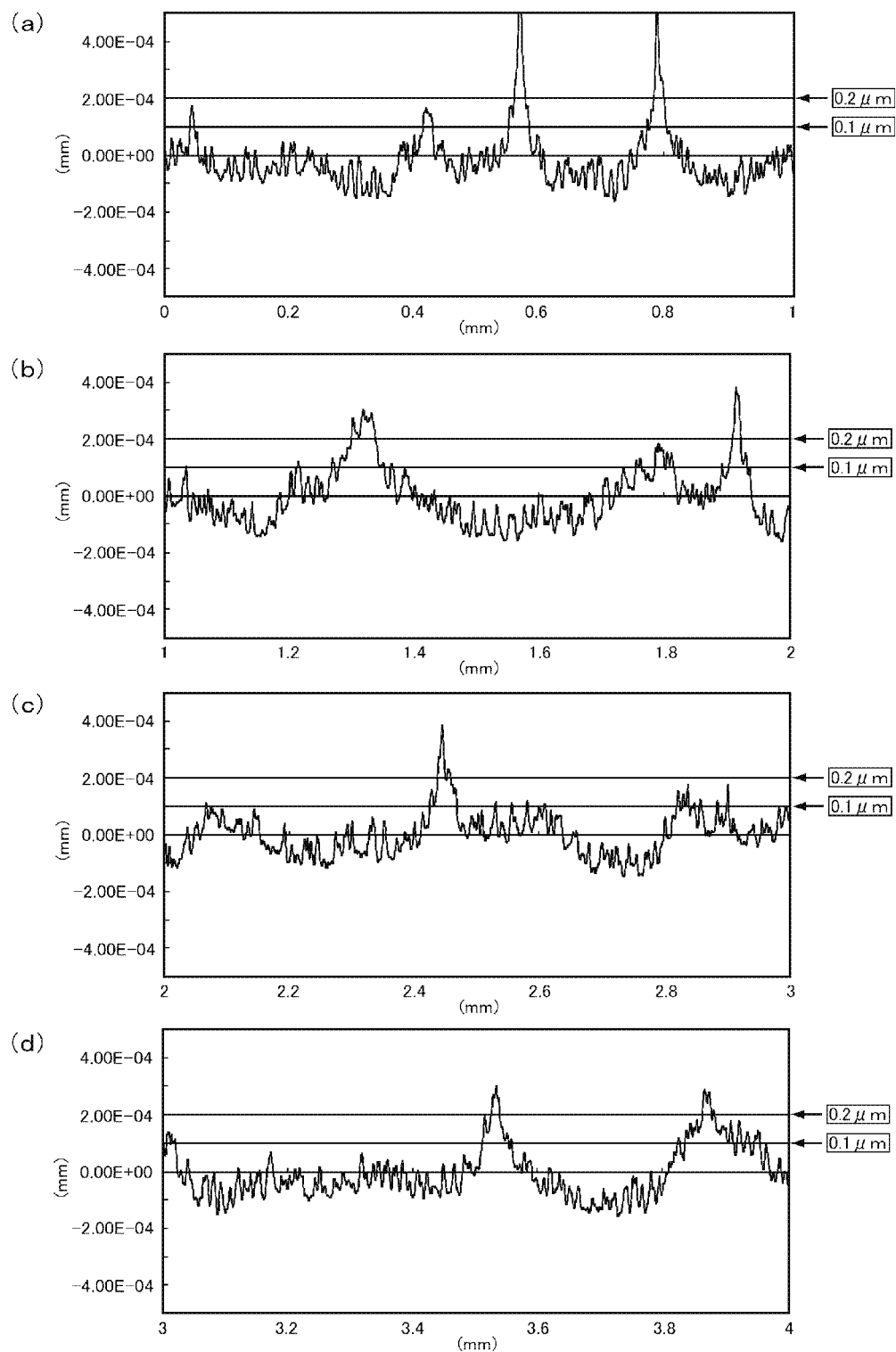
FIGS. 4(a) to (d) are diagrams showing profiles that indicate a measured length of 4 mm of a sectional surface shape of a hard-coated antiglare film according to Example 4; (a) shows a range of 0 to 1 mm, (b) a range of 1 to 2 mm, (c) a range of 2 to 3 mm, and (d) a range of 3 to 4 mm.
Figure 5:
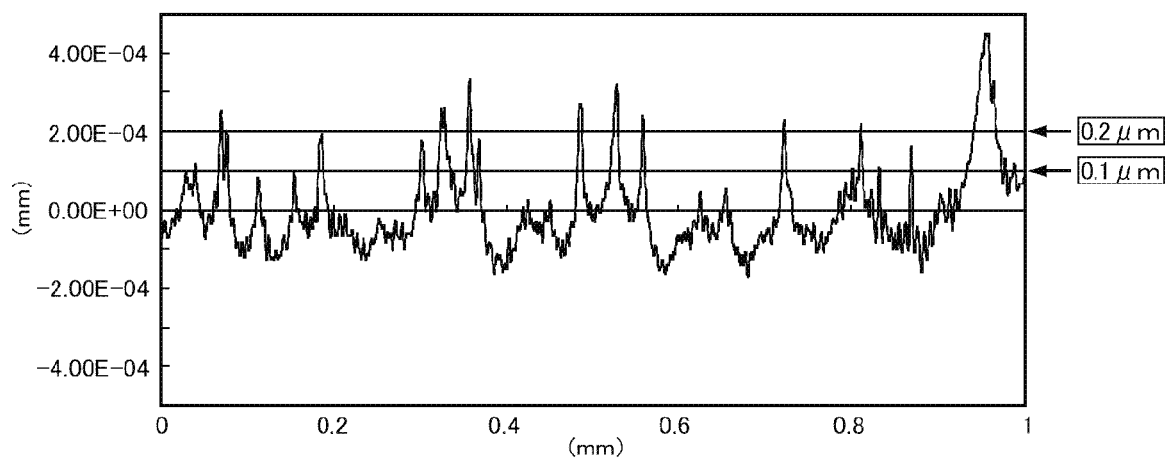
FIG. 5 is a diagram showing a profile that indicates a range of 0 to 1 mm out of a measured length of 4 mm of a sectional surface shape of a hard-coated antiglare film according to Comparative Example 1.
Figure 6:
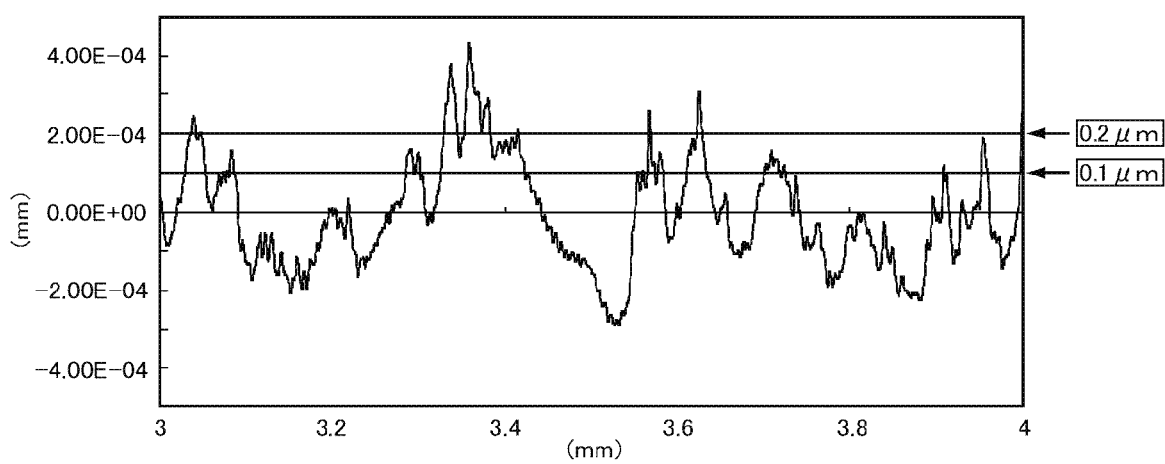
FIG. 6 is a diagram showing a profile that indicates a range of 3 to 4 mm out of a measured length of 4 mm of a sectional surface shape of a hard-coated antiglare film according to Comparative Example 2.
Figure 7:
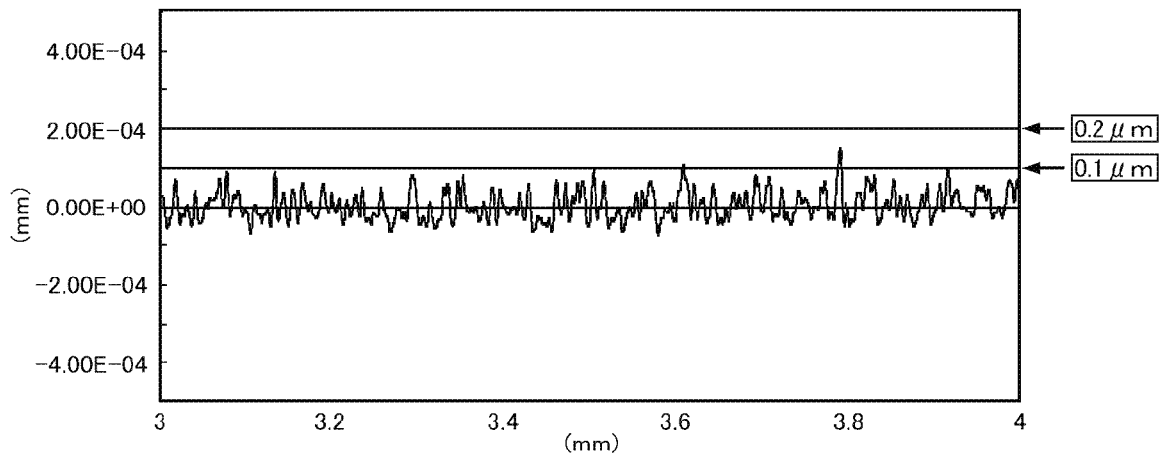
FIG. 7 is a diagram showing a profile that indicates a range of 3 to 4 mm out of a measured length of 4 mm of a sectional surface shape of a hard-coated antiglare film according to Comparative Example 3.
Figure 8:
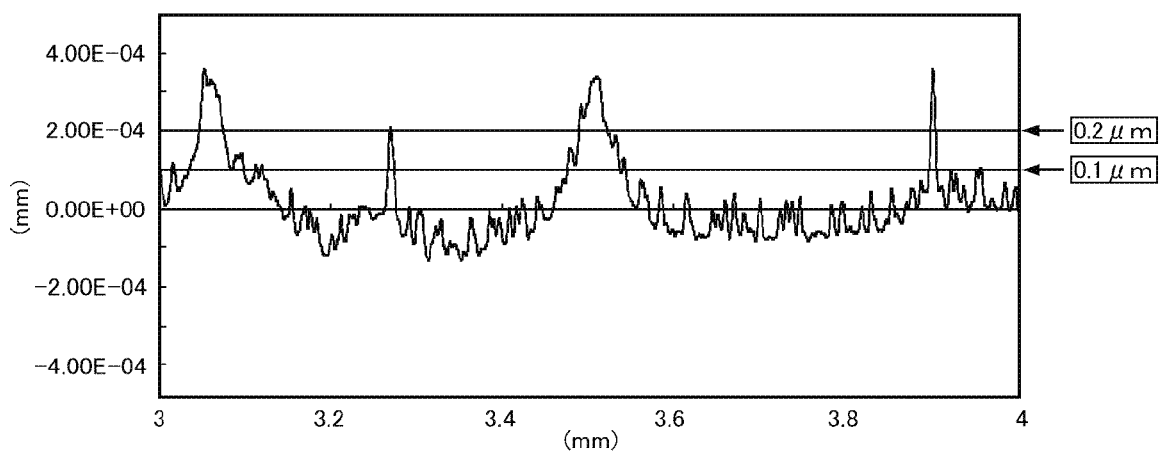
FIG. 8 is a diagram showing a profile that indicates a range of 3 to 4 mm out of a measured length of 4 mm of a sectional surface shape of a hard-coated antiglare film according to Comparative Example 4.
Figure 9:
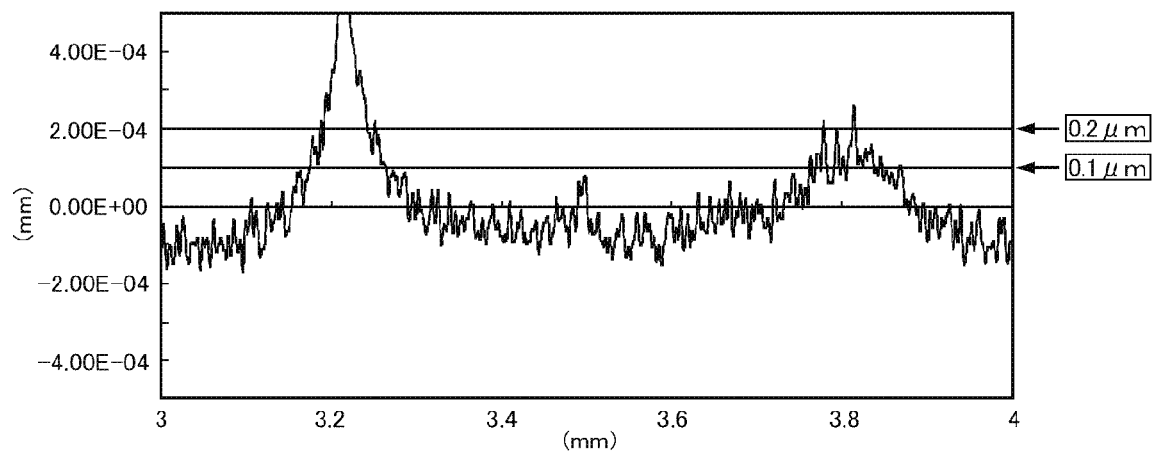
FIG. 9 is a diagram showing a profile that indicates a range of 3 to 4 mm out of a measured length of 4 mm of a sectional surface shape of a hard-coated antiglare film according to Comparative Example 5.
Figure 10:
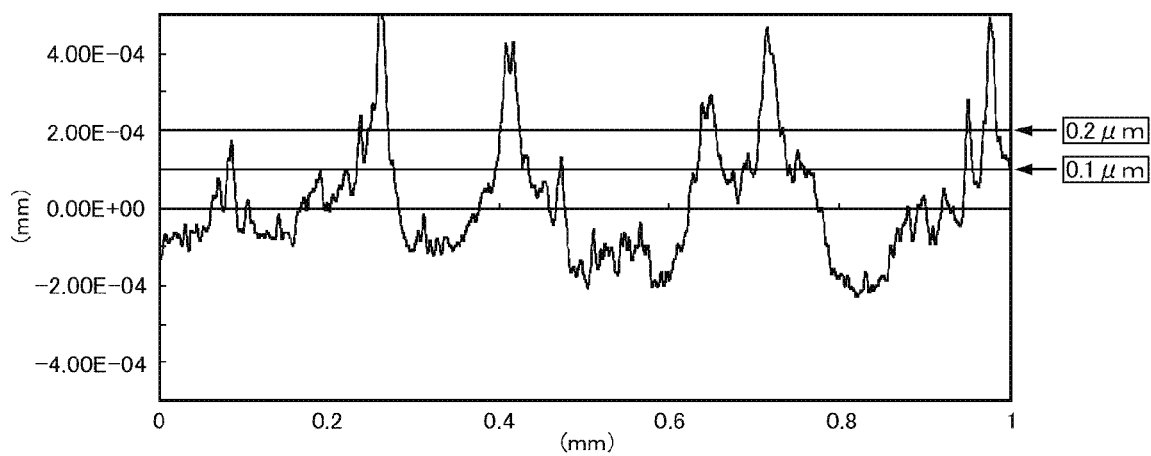
FIG. 10 is a diagram showing a profile that indicates a range of 0 to 1 mm out of a measured length of 4 mm of a sectional surface shape of a hard-coated antiglare film according to Comparative Example 6.
Figure 11:
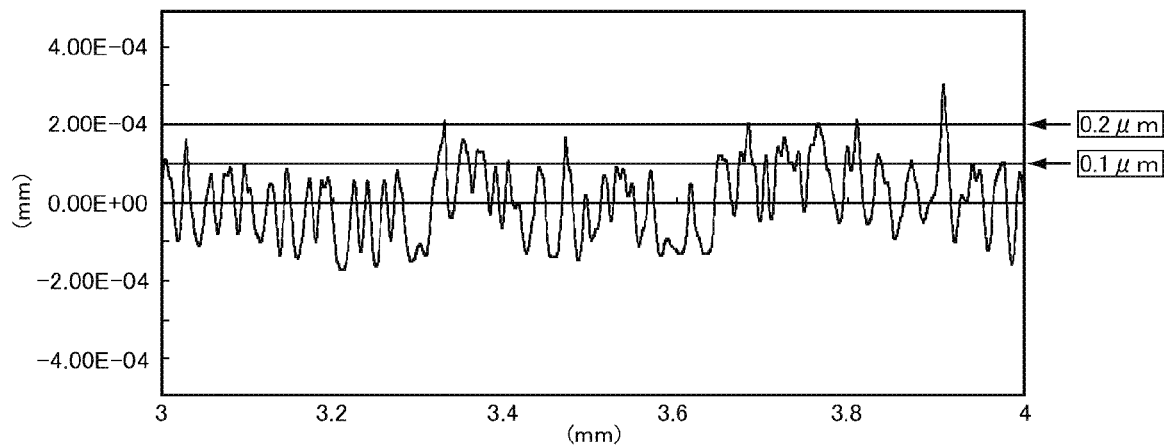
FIG. 11 is a diagram showing a profile that indicates a range of 3 to 4 mm out of a measured length of 4 mm of a sectional surface shape of a hard-coated antiglare film according to Comparative Example 7.
Figure 12:
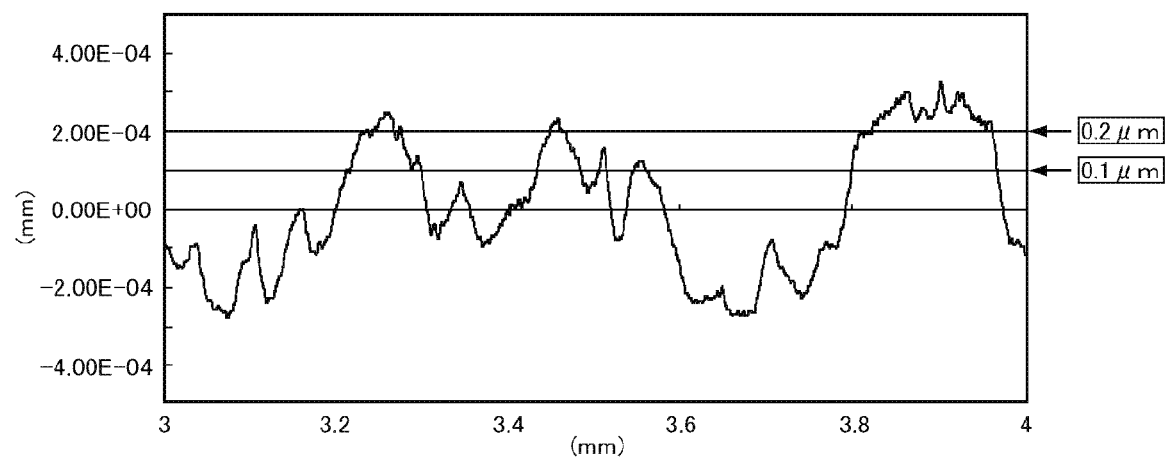
FIG. 12 is a diagram showing a profile that indicates a range of 3 to 4 mm out of a measured length of 4 mm of a sectional surface shape of a hard-coated antiglare film according to Comparative Example 8.
Figure 13:
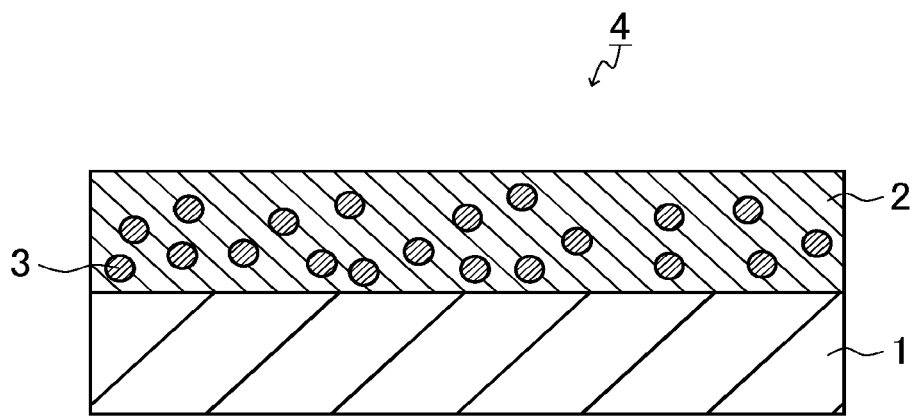
FIG. 13 is a schematic cross-sectional view showing the outline of a hard-coated antiglare film according to one embodiment of the invention.
Figure 14:
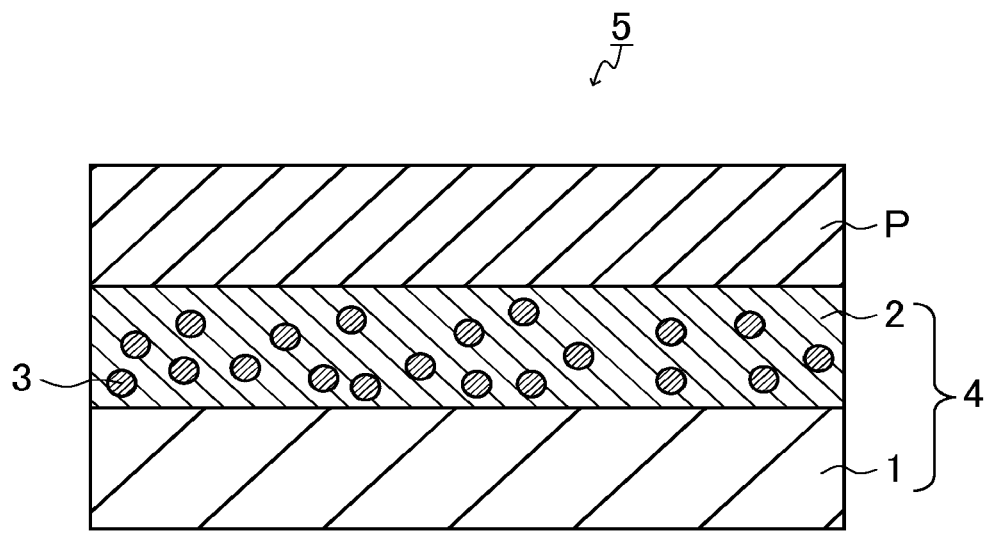
FIG. 14 is a schematic cross-sectional view showing the outline of a polarizing plate according to one embodiment of the invention.

With respect to each hard-coated antiglare film of Examples 1 to 4 and Comparative Examples 1 to 8 thus obtained, various properties were measured or evaluated. The results are indicated in FIGS. 1 to 12 and Table 1 below.

TABLE 1

| | Thickness of HC film (μm) | Particle size (μm) | The number of parts | Difference in refractive index | Total haze (%) | Ra (μm) | The number of convexities (first standard line) | | $N_{50}/N_{total}$ | The number of convexities (second standard line) (50 μm or shorter) | $M_{total}$ | $M_{100}/M_{total}$ | Anti-face glare properties | Anti-fluorescent lamp glare properties | White Blur |
|---|---|---|---|---|---|---|---|---|---|---|---|---|---|---|---|
| | | | | | | | $N_{total}$ | $N_{50}$ | | | | | | | |
| Ex. 1 | 6.0 | 3.0 | 5 | 0.005 | 2.1 | 0.10 | 19 | 13 | 0.68 | 2 | 63 | 0.38 | A | A | A |
| Ex. 2 | 6.0 | 3.0 | 5 | 0.005 | 1.1 | 0.09 | 17 | 9 | 0.53 | 5 | 79 | 0.24 | A | A | A |
| Ex. 3 | 5.0 | 3.0 | 5 | 0.005 | 1.5 | 0.12 | 18 | 11 | 0.61 | 3 | 83 | 0.35 | A | A | A |
| Ex. 4 | 5.0 | 3.0 | 10 | 0.005 | 2.3 | 0.07 | 18 | 9 | 0.50 | 1 | 46 | 0.20 | A | A | A |
| Comp. Ex 1 | 4.5 | 3.0 | 5 | 0.005 | 2.5 | 0.09 | 57 | 5 | 0.09 | 24 | 249 | 0.07 | AA | AA | B |
| Comp. Ex 2 | 6.4 | 3.0 | 10 | 0.005 | 2.6 | 0.15 | 33 | 9 | 0.27 | 13 | 179 | 0.30 | AA | AA | B |
| Comp. Ex 3 | 8.0 | 3.0 | 5 | 0.005 | 1.8 | 0.03 | 8 | 0 | 0.00 | 0 | 12 | 0.17 | C | C | A |
| Comp. Ex 4 | 6.0 | 3.0 | 5 | 0.005 | 2.1 | 0.05 | 12 | 4 | 0.33 | 4 | 32 | 0.16 | C | B | A |
| Comp. Ex 5 | 6.0 | 3.0 | 10 | 0.005 | 1.8 | 0.06 | 12 | 7 | 0.58 | 0 | 24 | 0.21 | B | B | A |
| Comp. Ex 6 | 5.5 | 3.0 | 12 | 0.005 | 1.8 | 0.08 | 35 | 12 | 0.34 | 5 | 107 | 0.13 | AA | B | A |
| Comp. Ex 7 | 9.0 | 5.5 | 5 | 0.03 | 13.0 | 0.10 | 55 | 1 | 0.02 | 6 | 204 | 0.09 | AA | B | AA |
| Comp. Ex 8 | 6.1 | 3.0 | 5 | 0.005 | 1.9 | 0.09 | 18 | 15 | 0.83 | 1 | 55 | 0.53 | B | A | AA | tured by SEKISUI PLASTICS CO., Ltd.) used as the fine particles, 0.1 parts by weight of leveling agent ("GRANDIC PC-4100" (product name), manufactured by DIC Corporation), and 0.5 parts by weight of photopolymerization initiator ("IRGACURE 127" (product name), manufactured by Ciba Specialty Chemicals) were mixed per 100 parts by weight of resin solid content of the material for forming a hard-coating layer. This mixture thus obtained was diluted so as to have a solid concentration of 45% by weight and a ratio of butyl acetate to MEK of 2/1. Thus, a material for forming a hard-coating antiglare layer was prepared.

A hard-coated antiglare film of Comparative Example 7 was obtained by the same method as in Example 1 except that a 9 μm-thick hard-coating antiglare layer was formed using the material for forming a hard-coating antiglare layer.

Comparative Example 8

1.0 parts by weight of the leveling agent and 5 parts by weight of the photopolymerization initiator were mixed per 100 parts by weight of resin solid content of the ultraviolet curable resin ("UNIDIC 17-806" (product name), manufactured by DIC Corporation). The mixture thus obtained was diluted with IPA so as to have a solid concentration of 2% by weight. Thus, an applying liquid was obtained. The applying liquid was applied onto a hard-coating antiglare layer of the hard-coated antiglare film obtained in Example 1 with a comma coater. Thus, an applied film was formed. Subsequently, it was heated at 100° C. for one minute and thus the As shown in Table 1 above, the examples showed favorable results in all of anti-fluorescent lamp glare properties, anti-face glare properties, and white blur. On the other hand, the comparative examples showed favorable results in some of anti-fluorescent lamp glare properties, anti-face glare properties, and white blur, but not in all of them.

That is, from Comparative Examples 1 and 2, it is proved that although anti-fluorescent lamp glare properties and anti-face glare properties are ensured, when the hard-coated antiglare film includes at least 10 convexities in which line segment of portions of the mean line that cross the convexities each have a length of 50 μm or shorter, among convexities that exceed the second standard line that is parallel with the mean line and is located at a height of 0.2 μm, excess scattering occurs, and thus, a result in white blur evaluation is unfavorable. From Comparative Examples 3 to 5, it is proved that when $N_{total}$ is less than 15, results in anti-fluorescent lamp glare properties and anti-face glare properties is unfavorable. From Comparative Examples 6 and 7, it is proved that when $N_{50}/N_{total}$ is less than 0.4, although results in anti-face glare properties are favorable, results in anti-fluorescent lamp glare properties are unfavorable. From Comparative Example 8, it is proved that when $N_{50}/N_{total}$ exceeds 0.8, although results in anti-fluorescent lamp glare properties are favorable, results in anti-face glare properties are unfavorable. By measuring the size and number of convexities and a haze value defined in the present invention, it also is possible to understand the tendency of visibility including, for example, anti-fluorescent lamp glare properties, anti-face glare properties, and white blur without performing visual evaluation.

FIGS. 1 to 12 show the profiles of the sectional surface shapes of the hard-coated antiglare films obtained in the aforementioned examples and comparative examples. As compared to the hard-coated antiglare films obtained in the comparative examples, each of the hard-coated antiglare film obtained in the examples is in a condition that large concavities and convexities and small concavities and convexities are present in balance. It can be understood that hard-coated antiglare films with surface unevenness shapes like those of the examples are within the range defined by the aforementioned size, number, and ratio of convexities, and haze value, and thereby can be used suitably as hard-coated antiglare films.

INDUSTRIAL APPLICABILITY

The hard-coated antiglare film of the present invention can have both the anti-fluorescent lamp glare properties and anti-face glare properties, and can prevent white blur from occurring. Further, by lowering a haze value, the depth of black in black display of image display under dark room environment can be improved. Accordingly, the hard-coated antiglare film of the present invention can be used suitably, for example, for optical elements such as polarizing plates as well as liquid crystal panels and image displays such as LCDs. It has no limitation in application and is applicable across a wide field. Furthermore, measurement of the number of convexities, which is defined in the present invention, also makes it possible to understand the tendency of visibility including, for example, antiglare properties and white blur without performing visual evaluation. Thus, they also are effective as indices for evaluating an antiglare film.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A hard-coated antiglare film, comprising:
a transparent plastic film substrate; and
a hard-coating antiglare layer containing fine particles, being on at least one surface of the transparent plastic film substrate, wherein
the hard-coated antiglare film has a total haze value in a range of 0% to 5%,
a number $N_{total}$ of convexities that exceed a first standard line that is parallel with a roughness mean line of a surface roughness profile and is located at a height of 0.1 μm is at least 15 in a 4-mm long portion at an arbitrary location of the surface of the hard-coating antiglare layer,
when the number of convexities that exceed the first standard line, in which line segments of portions of the mean line that cross the convexities each have a length of 50 μm or longer is indicated by $N_{50}$, $N_{total}$ and $N_{50}$ satisfy a relationship expressed by the following formula (1), and a number of convexities that exceed a second standard line that is parallel with the mean line and is located at a height of 0.2 μm, in which the line segments of portions each have a length of 50 μm or shorter is 10 or less $$0.4 \leq N_{50}/N_{total} \leq 0.8 \quad (1).$$

2. The hard-coated antiglare film according to claim 1, wherein
in a measured area, 595 μm×452 μm, at an arbitrary location of the surface of the hard-coating antiglare layer, a number $M_{total}$ of convexities that exceed a standard surface that is parallel with a roughness mean surface of a surface roughness profile and is located at a height of 0.5 μm is in a range of 40 to 150, and
$M_{total}$ and the number $M_{100}$ of convexities with a cross-sectional area at the standard surface of 100 μm² or more, among the convexities, satisfy a relationship expressed by the following formula (2)

$$0.15 \leq M_{100}/M_{total} \leq 0.5 \quad (2).$$

3. The hard-coated antiglare film according to claim 1, wherein
the hard-coating antiglare layer is formed using the fine particles and a material for forming a hard-coating layer,
a difference in refractive index between the material for forming a hard-coating layer and the fine particles is in a range of 0.001 to 0.02, and
the hard-coating antiglare layer contains, as the fine particles, at least one type of spherical and amorphous fine particles, each of which have a weight average particle size in a range of 0.5 to 8 μm, and the fine particles in a range of 2 to 15 parts by weight per 100 parts by weight of the material for forming a hard-coating layer.

4. The hard-coated antiglare film according to claim 1, wherein the hard-coating antiglare layer has a thickness in a range that is 1.6 to 3 times a weight average particle size of the fine particles.

5. The hard-coated antiglare film according to claim 1, wherein the hard-coating antiglare layer has a thickness in a range of 3 μm or more to less than 7.5 μm.

6. A polarizing plate, comprising:
the hard-coated antiglare film according to claim 1; and
a polarizer.

7. An image display, comprising:
the polarizing plate according to claim 6.

8. An image display, comprising:
the hard-coated antiglare film according to claim 1.

9. A method for producing the hard-coated antiglare film according to claim 1, comprising:
providing fine particles, a material for forming a hard-coating layer, and a material for forming a hard-coating antiglare layer, which contain a solvent;
forming a film by applying the material for forming a hard-coating antiglare layer onto at least one surface of the transparent plastic film substrate,
forming a hard-coating antiglare layer by curing the film, wherein
a solvent in which a ratio of an alcohol solvent is 50% by weight or more is used as the solvent.

* * * * *